(12) United States Patent
Fukuda et al.

(10) Patent No.: US 9,156,219 B2
(45) Date of Patent: Oct. 13, 2015

(54) TIRE VULCANIZER AND TIRE VULCANIZING SYSTEM

(71) Applicant: MITSUBISHI HEAVY INDUSTRIES MACHINERY TECHNOLOGY CORPORATION, Hiroshima-shi, Hiroshima (JP)

(72) Inventors: Hideki Fukuda, Tokyo (JP); Joji Yusa, Tokyo (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 85 days.

(21) Appl. No.: 14/007,636

(22) PCT Filed: Nov. 6, 2012

(86) PCT No.: PCT/JP2012/078736
§ 371 (c)(1),
(2) Date: Sep. 25, 2013

(87) PCT Pub. No.: WO2013/114694
PCT Pub. Date: Aug. 8, 2013

(65) Prior Publication Data
US 2014/0079837 A1    Mar. 20, 2014

(30) Foreign Application Priority Data
Feb. 3, 2012  (JP) .................. 2012-022367

(51) Int. Cl.
*B29D 30/06*  (2006.01)
(52) U.S. Cl.
CPC ........ *B29D 30/0606* (2013.01); *B29D 30/0603* (2013.01)
(58) Field of Classification Search
CPC .................................. B29D 30/0603
USPC ........................................... 425/38
See application file for complete search history.

(56) References Cited

U.S. PATENT DOCUMENTS 3,640,653 A * 2/1972 Laenen et al. .................. 425/38
4,092,090 A * 5/1978 Yuhas et al. ................. 425/58.1
(Continued)

FOREIGN PATENT DOCUMENTS

CN    2551436 Y    5/2003
CN    1832837 A    9/2006
(Continued)

OTHER PUBLICATIONS

Office Action mailed Sep. 29, 2014, corresponding to Taiwanese patent application No. 101142028.
(Continued)

*Primary Examiner* — James Mackey
(74) *Attorney, Agent, or Firm* — Kanesaka Berner & Partners, LLP

(57) ABSTRACT

A tire vulcanizer and tire vulcanizing system improving production efficiency by shortening time for loading and unloading of tires are provided. They include: a lower mold supporting part; an upper mold supporting part; a moving device moving the upper mold supporting part horizontally; an elevator device moving the upper mold vertically; a lift device pushing up a vulcanized tire held in the lower mold; and a tire supporting part supported by the upper mold supporting part. The tire supporting part moves between a supporting position and a retreated position. The bottom side of the vulcanized tire is supported by the tire supporting part at a peripheral side closer to the outside than a pushed-up position in the supporting position. The retreated position is positioned at a peripheral side closer to the outside than the vulcanized tire.

3 Claims, 11 Drawing Sheets

(56) References Cited

U.S. PATENT DOCUMENTS 6,158,998 A  12/2000  Irie
8,337,187 B2 * 12/2012  Hineno et al. .................. 425/38

FOREIGN PATENT DOCUMENTS

| CN | 102161237 A | 8/2011 |
|---|---|---|
| JP | 52-056179 A | 5/1977 |
| JP | 52-063975 A | 5/1977 |
| JP | 7-232329 A | 9/1995 |
| JP | 8-164528 A | 6/1996 |
| JP | 9262840 A | 10/1997 |
| JP | 10-034660 A | 2/1998 |
| JP | 2000-317943 A | 11/2000 |
| JP | 2002-361631 A | 12/2002 |
| JP | 3540500 B2 | 7/2004 |

OTHER PUBLICATIONS

Written Opinion mailed Feb. 12, 2013, corresponding to International application No. PCT/JP2012/078736.

International Search Report and Written Opinion corresponding to PCT/JP2012/078736, dated Feb. 12, 2013.

Office Action dated Jan. 7, 2015, corresponding to Chinese patent application No. 201280014267.5.

Notice of Allowance mailed May 29, 2015, corresponding to Korean patent application No. 10-2013-7024162.

* cited by examiner

TIRE VULCANIZER AND TIRE VULCANIZING SYSTEM

RELATED APPLICATIONS

The present application is a National Phase of International Application Number PCT/JP2012/078736, filed Nov. 6, 2012, and claims priority from Japanese Application Number 2012-022367, filed Feb. 3, 2012.

TECHNICAL FIELD

The present invention relates to a tire vulcanizer and a tire vulcanizing system.

Priority is claimed on Japanese Patent Application No. 2012-022367, filed Feb. 3, 2012, the content of which is incorporated herein by reference.

BACKGROUND ART

In the tire vulcanizing system vulcanizing large tires used for construction machines or the like, conventionally, un-vulcanized raw tire is loaded in a lower mold free of an upper mold above using a loading device. Then, the upper and lower molds are closed by moving the upper or lower mold. Then, vulcanizing process is performed in a high-heat and high-pressure condition. Vulcanized tires after the vulcanizing process are unloaded after opening the upper and lower molds. Then, the above-described sequence of processes is repeated.

Patent Literature 1 (PTL 1) discloses a tire vulcanizing system. The tire vulcanizing system is provided with a tire vulcanizer in which the vulcanized tire is left in the lower mold after the vulcanizing process. In the tire vulcanizing system, the vulcanized tire is unloaded from the tire vulcanizer by using a loading device.

RELATED ART DOCUMENT

Patent Literature

Patent Literature 1: Japanese Unexamined Patent Application, First Publication No. 2000-317943

DISCLOSURE OF INVENTION

Problems to be Solved by the Invention

When loading and unloading of the vulcanized tires are performed by using the above-mentioned loading device, however, it takes a long period of time for the loading and unloading, reducing productivity.

More specifically, the loading device moves the chucking device gripping the tire from the loading position above the lower mold to the exporting position after retraction of the upper mold above the lower mold. Then, the loading device is moved from the importing position to the loading position. Therefore, it is a required for the loading device to make reciprocating movements twice.

The present invention is made under circumstance described above. The purpose of the present invention is to provide a tire vulcanizer and a tire vulcanizing system capable of shortening the period of time for loading and unloading of tires to improve production efficiency.

Means for Solving the Problems

The first aspect of the present invention is a tire vulcanizer that vulcanizes a tire loaded inside with a lower mold and an upper mold provided to an upper part of the lower mold, the tire vulcanizer including: a lower mold supporting part configured to support the lower mold; an upper mold supporting part configured to support the upper mold; a moving device that is configured to move the upper mold supporting part in a horizontal direction; an elevator device that is configured to move the upper mold supporting part in a vertical direction; a lift device that is configured to push up a vulcanized tire held in the lower mold in a condition where the upper mold supporting part is elevated with the elevator device in such a way that the upper mold is retreated above the lower mold; and a tire supporting part that is supported by the upper mold supporting part and configured to be movable between a supporting position and a retreated position, a bottom side of the vulcanized tire being supported at a peripheral side closer to the outside than a pushed-up position pushed upward by the lift device in the supporting position, and the retreated position being positioned at a peripheral side closer to the outside than the vulcanized tire.

In the tire vulcanizer of the first aspect of the present invention, the tire supporting part may include: an shaft section supported rotatably by the upper mold supporting part; an arm section extended from the shaft section; and a support section protruding from the arm section and configured to support the bottom side of the vulcanized tire.

Other aspect of the present invention is a tire vulcanizing system including: the tire vulcanizer according to the first aspect of the present invention; a loading device that is provided next to the tire vulcanizer and configured to place an un-vulcanized tire on the lower mold supported by the lower mold supporting part of the tire vulcanizer; and a receiving device that is provided next to the tire vulcanizer and configured to accept the vulcanized tire moved in a rear direction by the moving device of the tire vulcanizer.

Effects of the Invention

According to the tire vulcanizer related to the above-described aspect of the present invention, the period of time for loading and unloading tires can be shortened, and production efficiency can be improved.

BEST MODE FOR CARRYING OUT THE INVENTION

The tire vulcanizer 3 and the tire vulcanizing system 1 related to an embodiment of the present invention are explained below.

Figure 1:
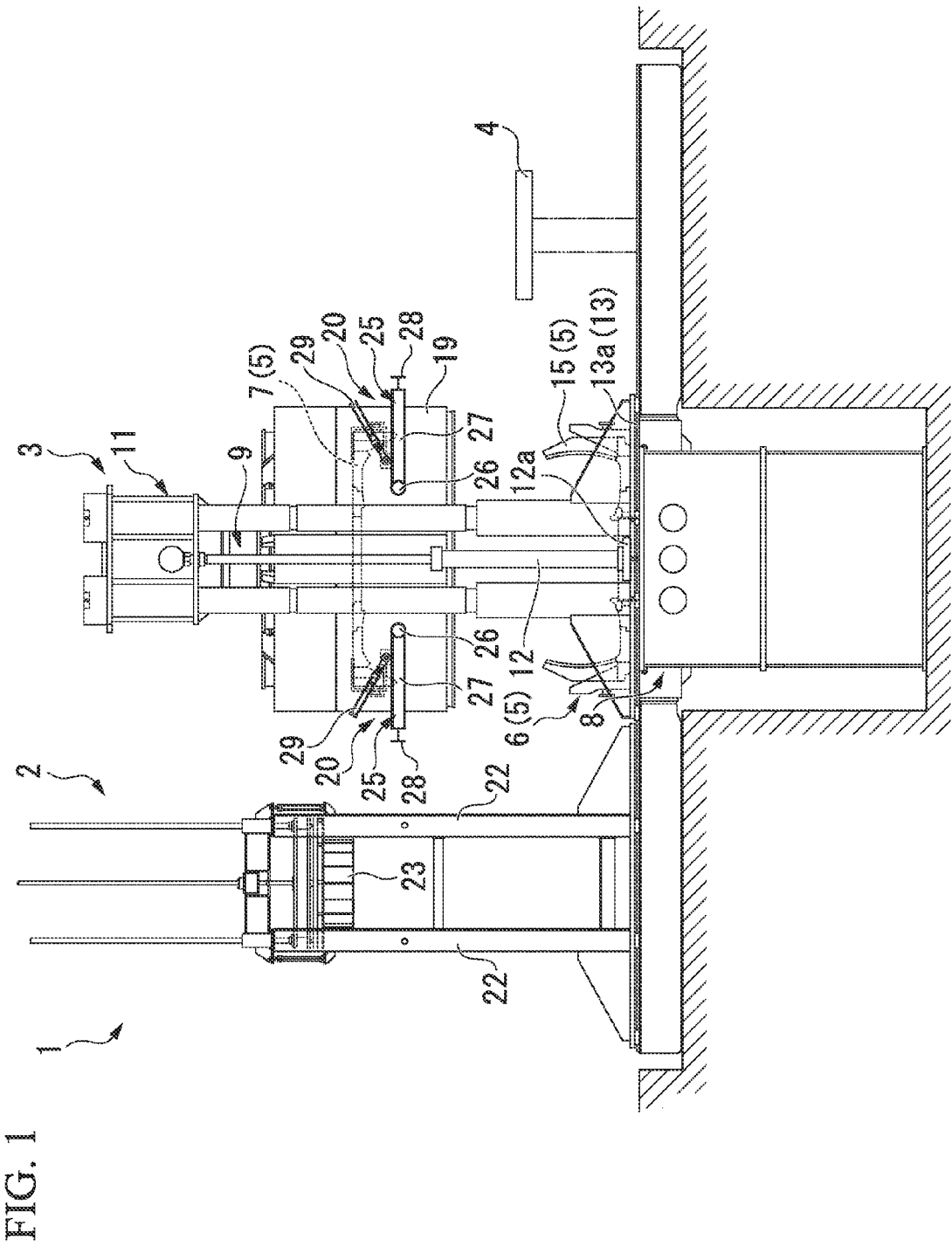
FIG. 1 is a side view of the tire vulcanizing system of an embodiment of the present invention.

FIG. 1 shows the tire vulcanizing system 1 of the present embodiment. The tire vulcanizing system 1 of the present embodiment is a tire vulcanizing system for vulcanizing large tires for construction machines or the like. In the explanation of the present embodiment below, the left side of the drawing, in which the un-vulcanized raw tire T1 (hereinafter, referred as the raw tire T1) is imported, is referred to as the "front side", except for cases specifically stating otherwise. Also, the right side of the drawing, in which the vulcanized tire T2 is exported, is referred to as the "rear side."

In the tire vulcanizing system 1, the loading device 2, the tire vulcanizer 3, and the receiving device 4 are aligned in the order from the front side, in which the raw tire T1 (see FIG. 2) is imported, to the rear side, in which the vulcanized tire T2 (see FIG. 2) is exported.

The tire vulcanizer 3 includes the lower mold 6 and the upper mold 7 that is provided above the lower mold 6. The raw tire T1 is vulcanized after loaded in the mold 5. The mold 5 is formed by assembling the lower mold 6 and the upper mold 7. The raw tire T1 is held in the mold 5 in such a way that the axis line of the tire is directed in the vertical direction.

The upper mold 7 is supported by the upper mold supporting part 9. The upper mold supporting part 9 is supported by the elevator device 11. The lower mold 6 is supported by the lower mold supporting part 8. The lower mold supporting part 8 is fixed on a predetermined floor position.

The elevator device 11 includes the cylinder 12 which is capable of extending and contracting in the vertical direction. The upper mold supporting part 9 is fixed to the cylinder 12. The lower end 12a of the cylinder 12 is supported by the moving device 13. By the moving part 13, the elevator device 11 and the upper mold supporting part 9 are capable of moving in the horizontal direction, more specifically, in the front side and back side direction. The moving device 13 includes the rail 13a extending in the front side and rear side direction, and an actuator not illustrated in the drawing. The elevator device 11 is capable of shifting positions in the front-rear horizontal direction along the rail 13a by driving the actuator. The upper mold supporting part 9 is capable of moving horizontally between the position vertically above the lower mold supporting part 8 and the position vertically above the receiving device 4 by the moving device 13.

Figure 6:
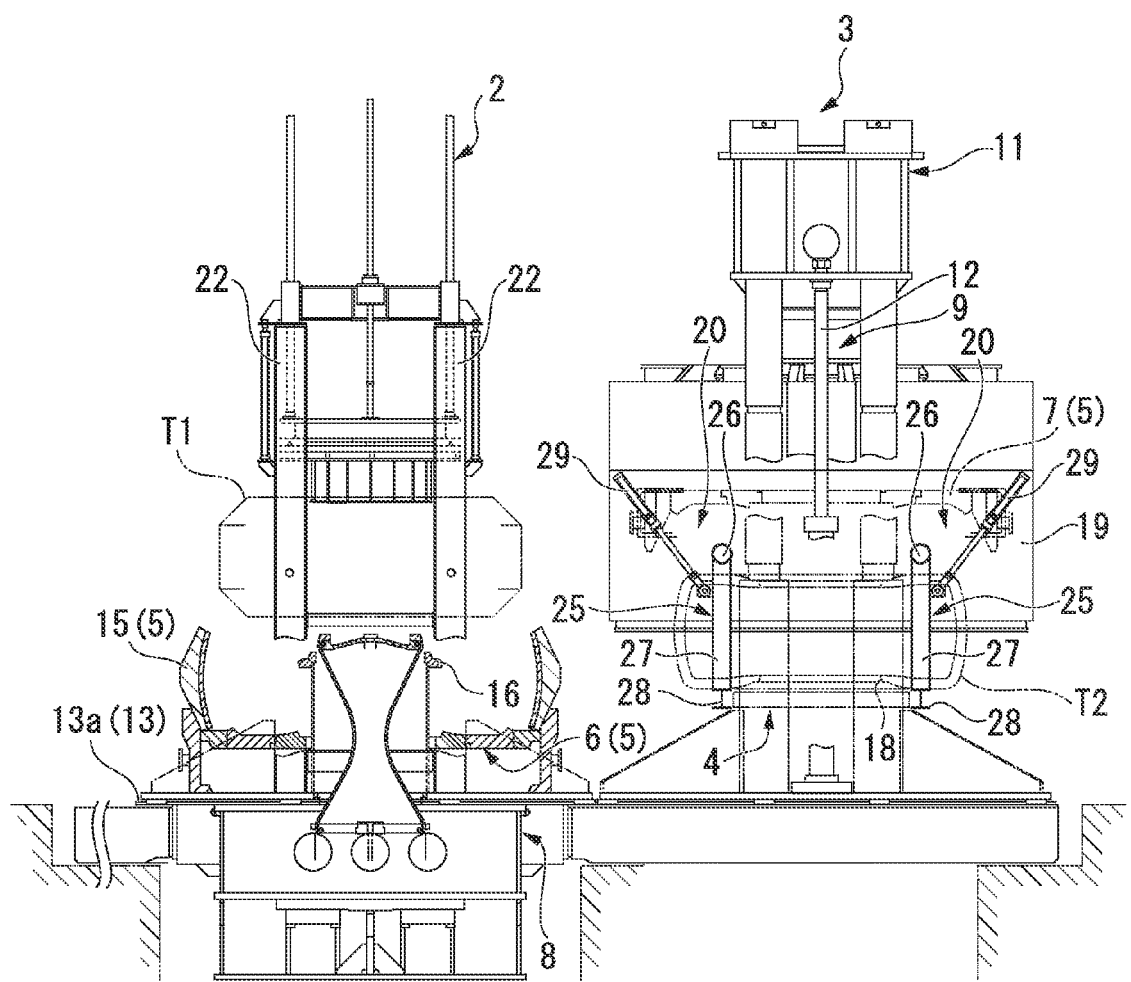
FIG. 6 is a side view of the embodiment in the process for unloading the vulcanized tire.
Figure 7:
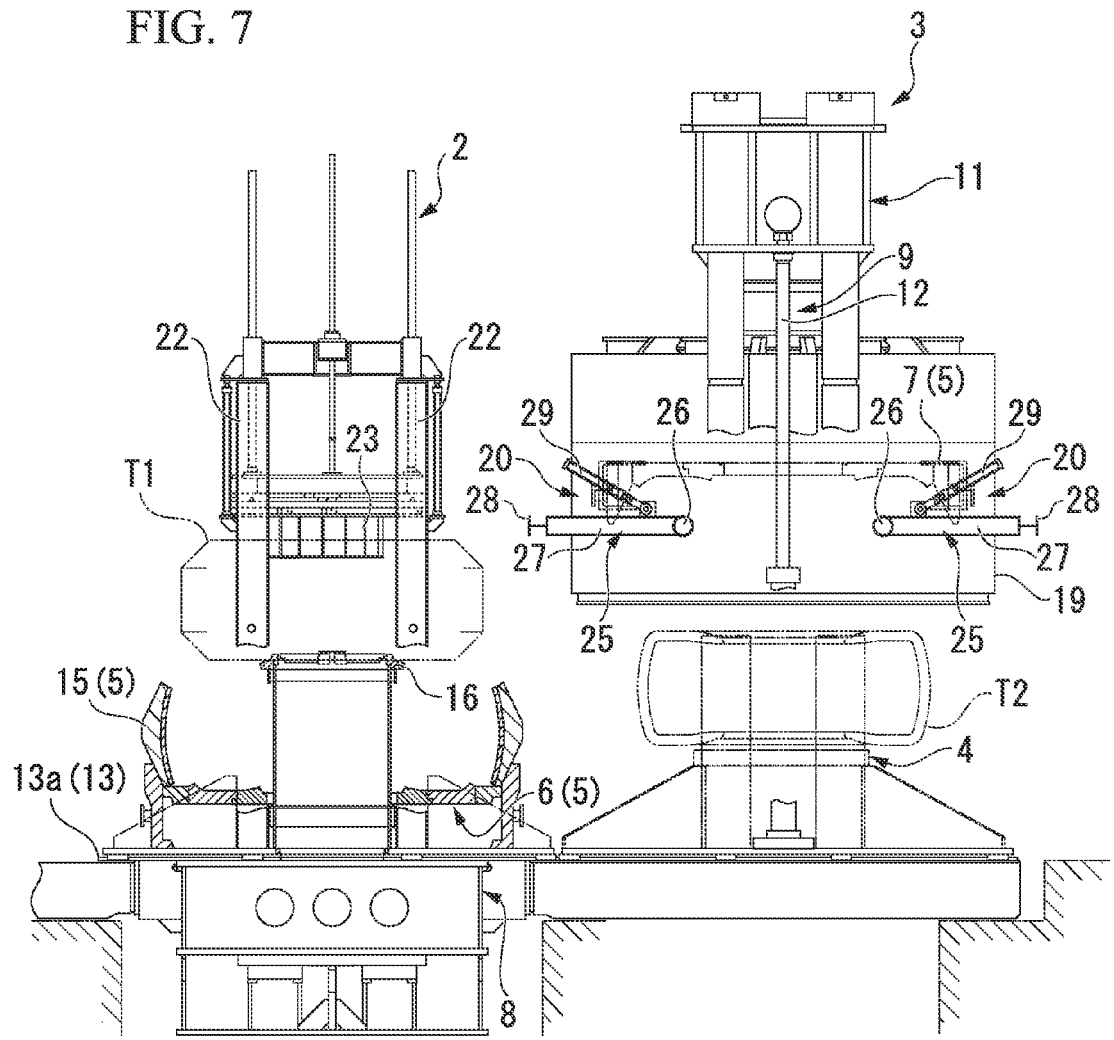
FIG. 7 is a side view of the embodiment in the process for loading the un-vulcanized raw tire.

The elevator device 11 can move the upper mold supporting part 9 vertically when the upper mold supporting part 9 is located vertically above the lower mold supporting part 8 (see FIGS. 2 and 3), and when the upper mold supporting part 9 is relatively displaced to the rear side horizontally from the location vertically above the lower mold supporting part 8 (see FIGS. 6 and 7).

Figure 3:
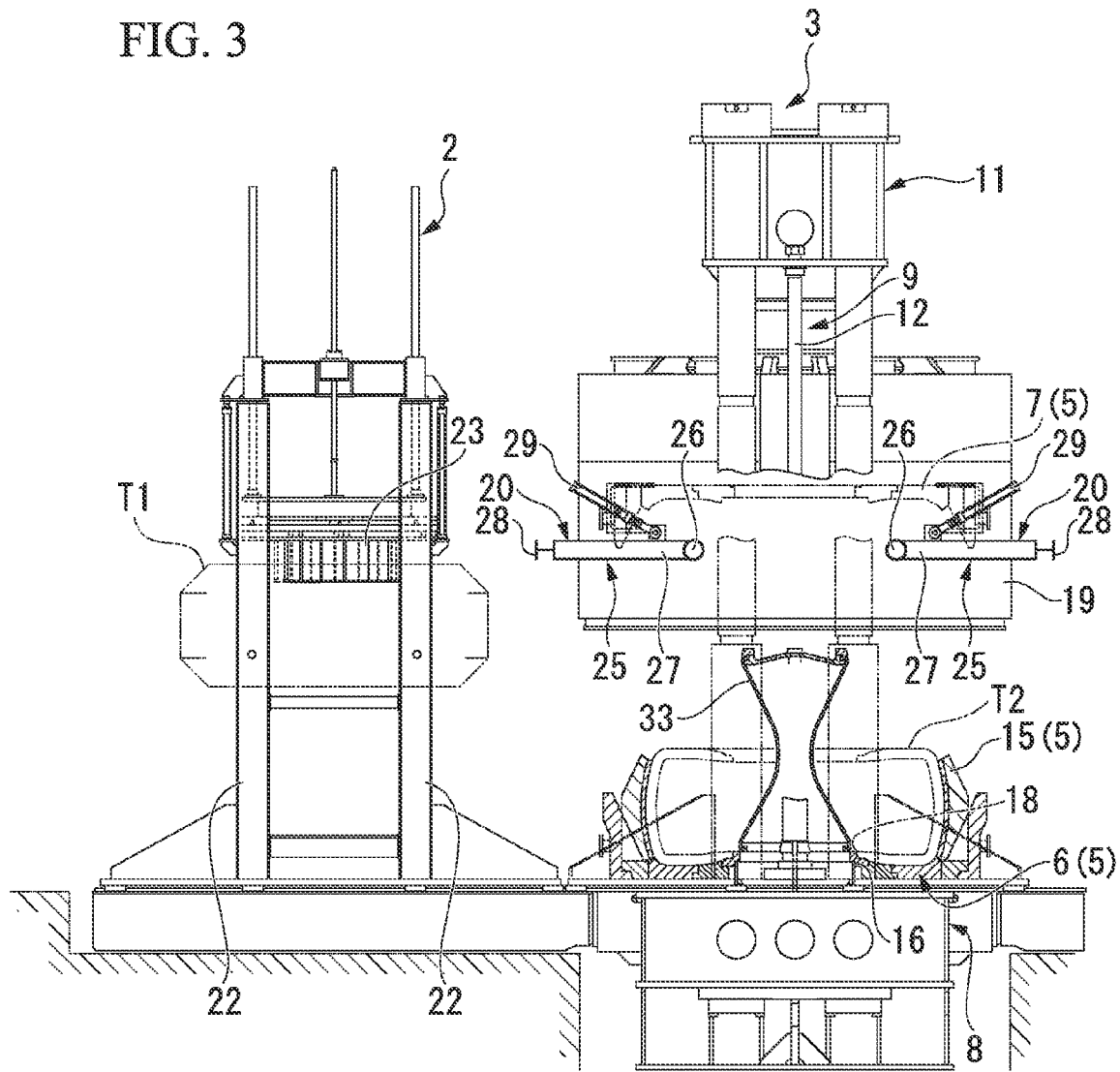
FIG. 3 is a side view of the embodiment in the state where the upper mold supporting part is elevated.
Figure 4:
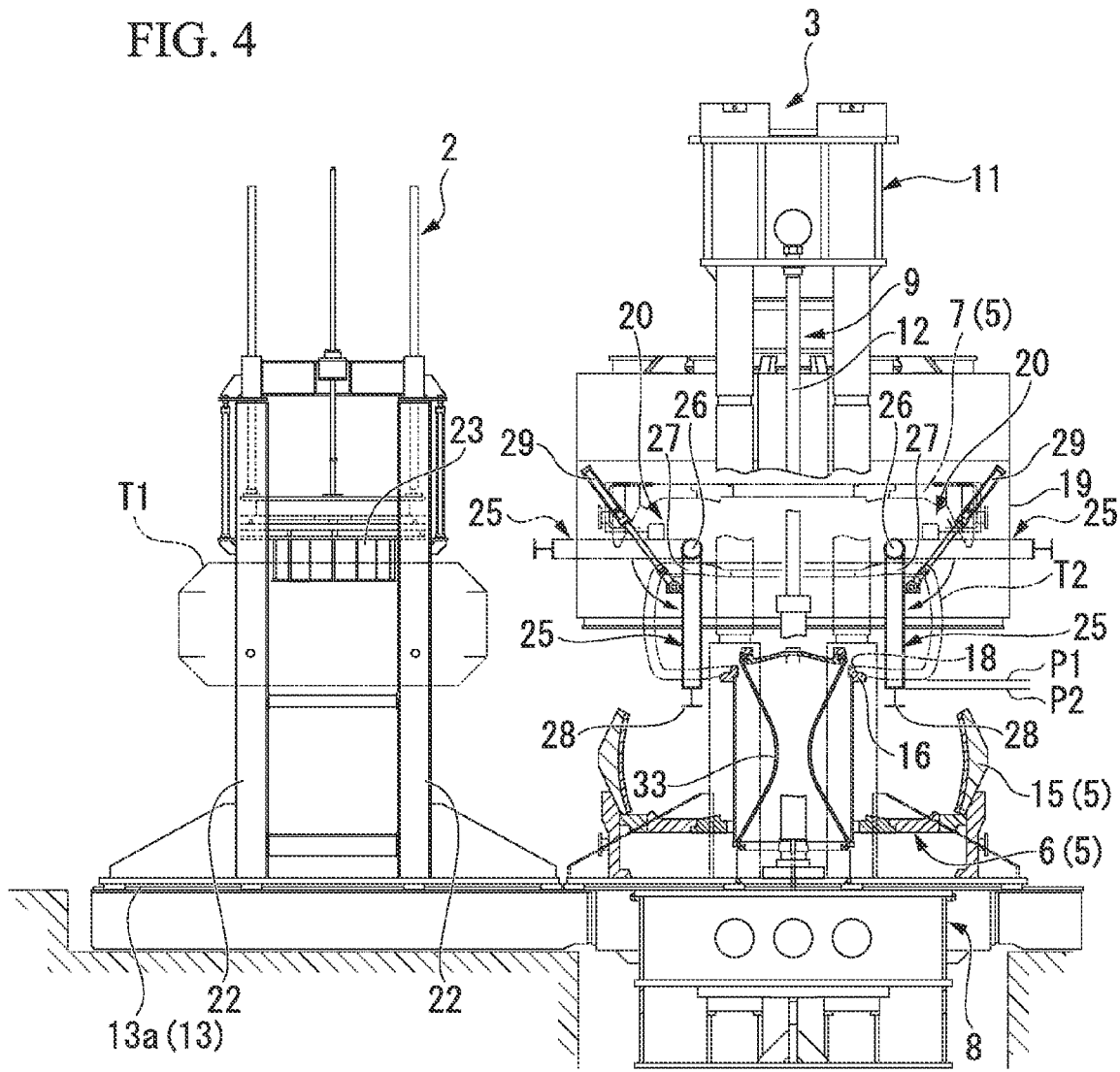
FIG. 4 is a side view of the embodiment in the process for unloading the vulcanized tire.

The lower mold 6 includes the segmental molds 15 that are formed separately in circumferential direction as shown in FIGS. 3 and 4. The tread part of the raw tire T1 is formed mainly by these segmental molds 15. The segmental molds 15 are capable of shifting their positions between the opened-position, in which the neighboring segments are separated each other (see FIG. 4), and the closed-position, in which they are contacted tightly (see FIG. 3). The segmental molds 15 shift their position to the opened-position when they are slid upward by a driving mechanism not shown. The segmental mold 15 shifts their position to the closed-position when they are slid downward by the driving mechanism.

The lower mold supporting part 8 includes the lift device 16 that pushes up the vulcanized tire T2 held in the lower mold 6 and separates the vulcanized tire T2 from the lower mold 6. The lift device 16 pushes the vulcanized tire T2 to separate it from the lower mold 6 when the upper mold supporting part 9 is elevated by the elevator device 11 to retreat the upper mold 7 above the lower mold 6 and when the segmental molds 15 are in the opened-position.

The lift device 16 is capable of moving upward and downward by a cylinder not shown in the drawing and pushing up the vulcanized tire T2 upward by pressing the bead part, which is the inner circumferential edge of the vulcanized tire T2, from the lower side. Then, the lift device 16 holds the vulcanized tire T2 at a predetermined pushed-up position after pushing up the vulcanized tire T2 held in the lower mold 6 to separate it from the lower mold 6 (see FIG. 4).

The upper mold supporting part 9 includes the circular dome part 19 and the bolster plate (not shown in the drawings) provided inside of the dome part 19. Steam for vulcanization is supplied in the dome part 19.

Furthermore, the upper mold supporting part 9 includes the tire supporting device 20 provided to the circular dome part 20. The tire supporting device 20 is capable of supporting the vulcanized tire T2, which is held in the pushed-up position, from the lower side of the vulcanized tire T2. The vulcanized tire T2 can be exported by elevating the upper mold supporting part 9 by the elevator device 11 and moving it to the rear side horizontally by the moving device 13 in the state where the vulcanized tire T2 is held by the tire supporting device 20.

The loading device 2, which is provided to the front side and next to the tire vulcanizer 3, loads the raw tire T1 supplied from the outside of the tire vulcanizing system to the lower mold 6. The loading device 2 is capable of moving between the importing position, in which the un-vulcanized tire is received (see FIG. 2), and the loading position, in which the raw tire T1 is held in the lower mold supporting part 8 (see FIG. 6), along the rail 13a extended in the front side rear side horizontal direction.

The loading device 2 includes the chucking device 23 that is capable of shifting positions upward and downward along the pair of guides 22. The chucking device 23 includes hooks (not shown) hooking the internal circumference entirely by being inserted in the bead part 18 of the raw tire T1 and opened outward (not shown). The chucking device 23 can grip the raw tire T1, which is provided from outside of the tire vulcanizing system 1, from the inner circumference side of the raw tire T1 and lift it by using the hooks.

The receiving device 4 is provided next to the tire vulcanizer 3. It is provided in the opposite side to the loading device 2 in the front side rear side direction. The receiving part 4 includes receiving table or the like, on which the vulcanized tire T2 can be placed, by supporting the bead part from the lower side, for example. The vulcanized tire T2 placed on the receiving table is exported to the outside of the tire vulcanizing system 1 by an exporting device not shown in the drawings.

Figure 10:
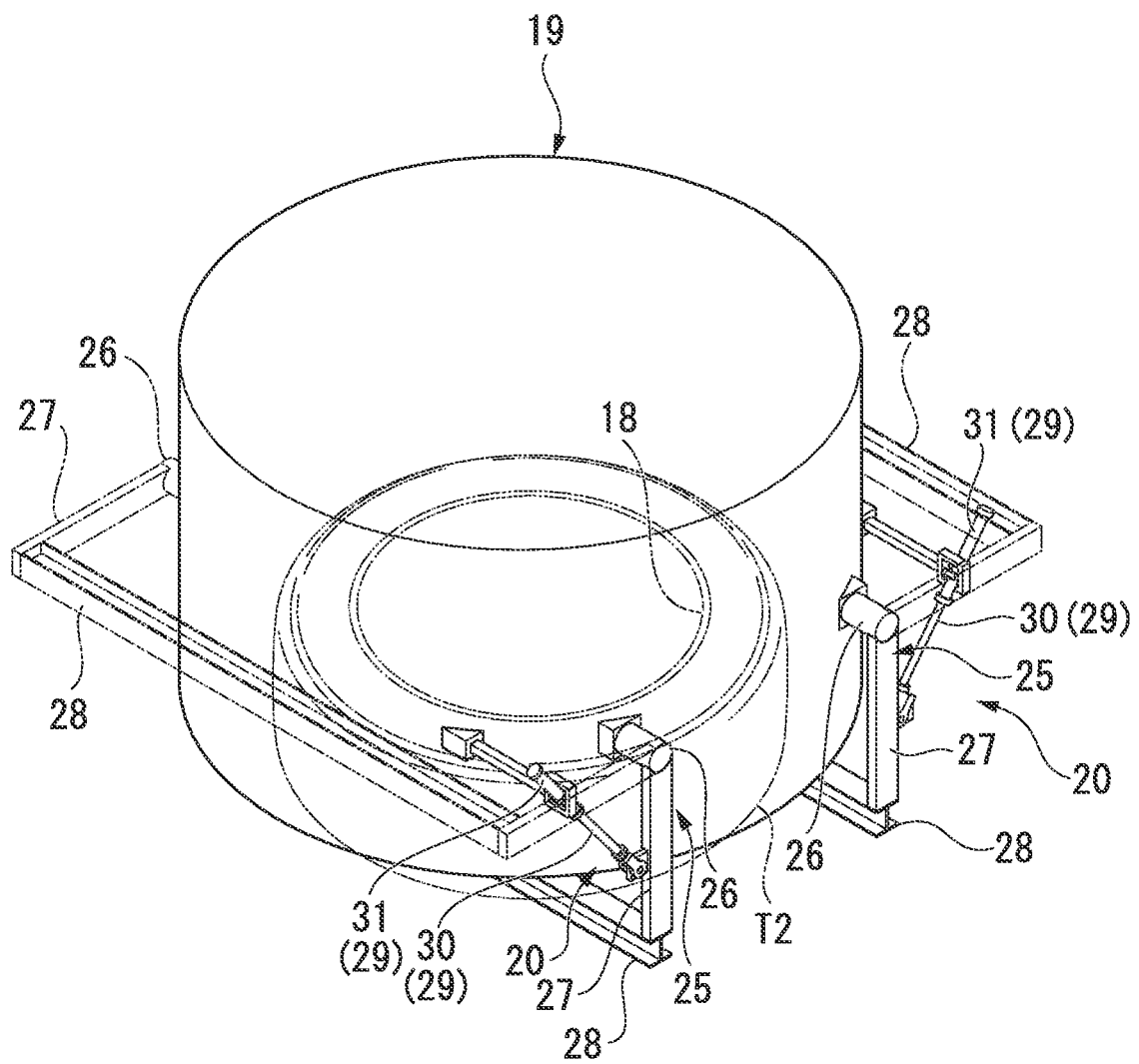
FIG. 10 is a perspective view of the upper mold supporting part of the embodiment.
Figure 11:
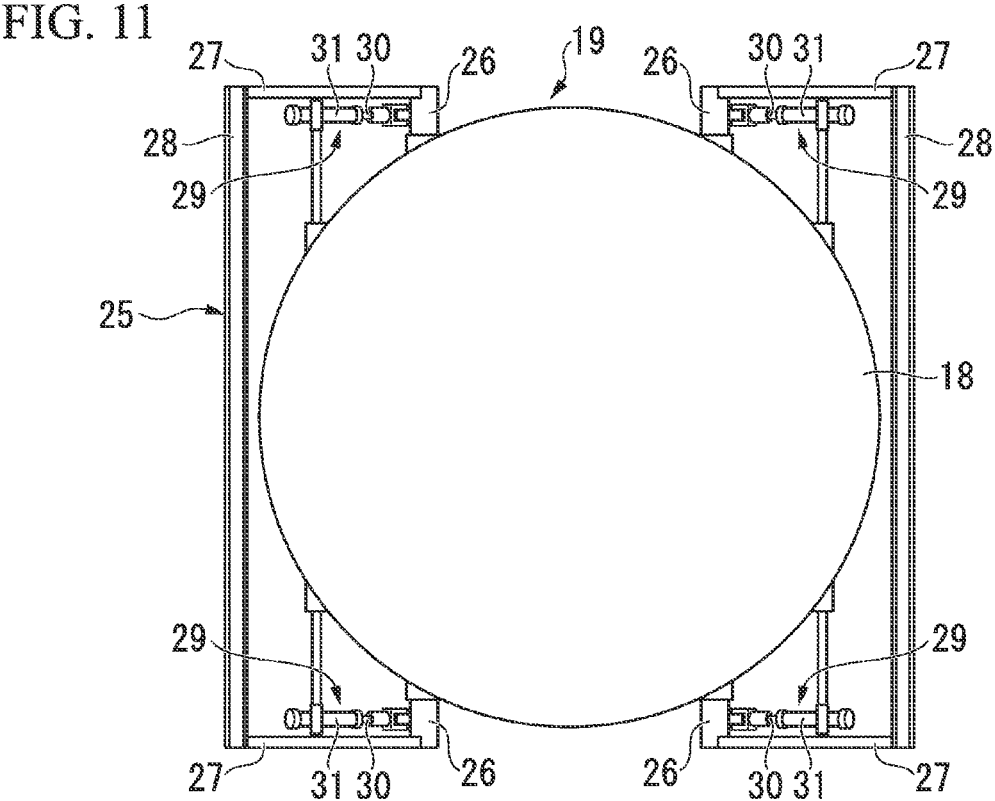
FIG. 11 is a plane view of the upper mold supporting part of the embodiment.

FIGS. 10 and 11 show the tire supporting device 20 in the present embodiment. This tire supporting device 20 includes a pair of tire supporting parts 25, which are capable of supporting the vulcanized tire T2 from its lower side. The tire supporting part 20 includes the rotating shaft 26, which is provided rotatably on the outer circumference of the dome part 19, the swing arm section 27, which is formed by using a wide flange beam for example, and the support arm section

28. The rotation axes 26 of each tire supporting part 25 are positioned in such a way that space between them are longer than the inner diameter of the vulcanized tire T2 and shorter than the outer diameter of the vulcanized tire T2. The swing arm section 27 is supported to the rotation shaft 26 at one end and being capable of swinging. The support arm section 28 is fixed between the other ends of the different swing arm sections 27.

An extending and contracting device 29 made of a hydraulic cylinder, an air cylinder, or the like, is engaged with the swing arm section 27. The end part of the inner rod 30 of the extending and contracting device 29 can change its angle relative to the swing arm section 27. Also, the central part in the longitudinal direction of the outer case 31 of the extending and contracting device 29 is supported by the dome part 19 and capable of changing its angle relative to the dome part 19.

The tire supporting part 25 is capable of swinging the swing arm section 27 by extension and contraction of the extending and contracting device 29. The tire supporting part 25 is capable of shifting positions between the supporting position (shown by solid lines in FIG. 10), in which the bottom side of the vulcanized tire is supported at a peripheral side closer to the outside than the bead part 18 pushed by the lift device 16, and the retreated position (shown by two-dot chain lines in FIG. 10), which is positioned at the outside of the outer peripheral side of the vulcanized tire T2. FIG. 11 indicates the situation where the tire supporting part 25 is in the retreated position.

When the tire supporting part 25 is in the supporting position, the swing arm section 27 extends to the lower side in the axis direction of the dome part 19. Because of this, the supporting arm section 28 extends to traverse just below the dome part 19. Contrary to that, when the tire supporting part 25 is in the retreated position, the swing arm section 27 extends to the outside of the dome part 19 in the radial direction of the dome part 19. Thus, the supporting arm section 28 is extended at the outer side than the outer peripheral side of the dome part 19 in the radial direction.

Next, the action picking up the vulcanized tire T2 by the tire supporting part 20 is explained in reference to FIG. 4.

First, the vulcanized tire T2 is pushed up by the lift device 16 to the holding position when the tire supporting part 25 is kept at the retreated position (shown in two-dot chain lines in FIG. 4). In the holding position, the lower end P1 of the sidewall part and shoulder part of the vulcanized tire T2 locates slightly above the upper end surface P2 of the supporting arm section 28 in the supporting position.

Next, the position of tire supporting part 25 is shifted from the retreated position to the supporting position (shown in solid lines in FIG. 4). Because of this, the supporting arm section 28 extends under the vulcanized tire T2 and at the outside of the bead part 18 in the radial direction. When the lift device 16 is lowered in this situation, the supporting arm section 28 is abutted to the sidewall part or the shoulder part of the vulcanized tire T2 in the outside of the bead part. When the lift device 16 is further lowered from the abutting state, the vulcanized tire T2 is released from the lift device 16 to be picked up. When the vulcanized tire T2 is dropped off from the tire supporting part 25 contrary to the picking up motion described above, the position of the tire supporting part 25 is shifted from the supporting position to the retreated position after placing the bead part 18 of the vulcanized tire on the above-described receiving table (not shown in the drawings) of the receiving device 4. By operating the tire supporting part 25 as described above, the vulcanized tire T2 can be dropped off from the tire supporting part 25.

Next, the sequence of processes related to the tire vulcanizing in the above-described tire vulcanizing system 1 is explained in reference to the drawings. In this explanation, the vulcanizing process by the vulcanizer is defined as the starting point.

Figure 2:
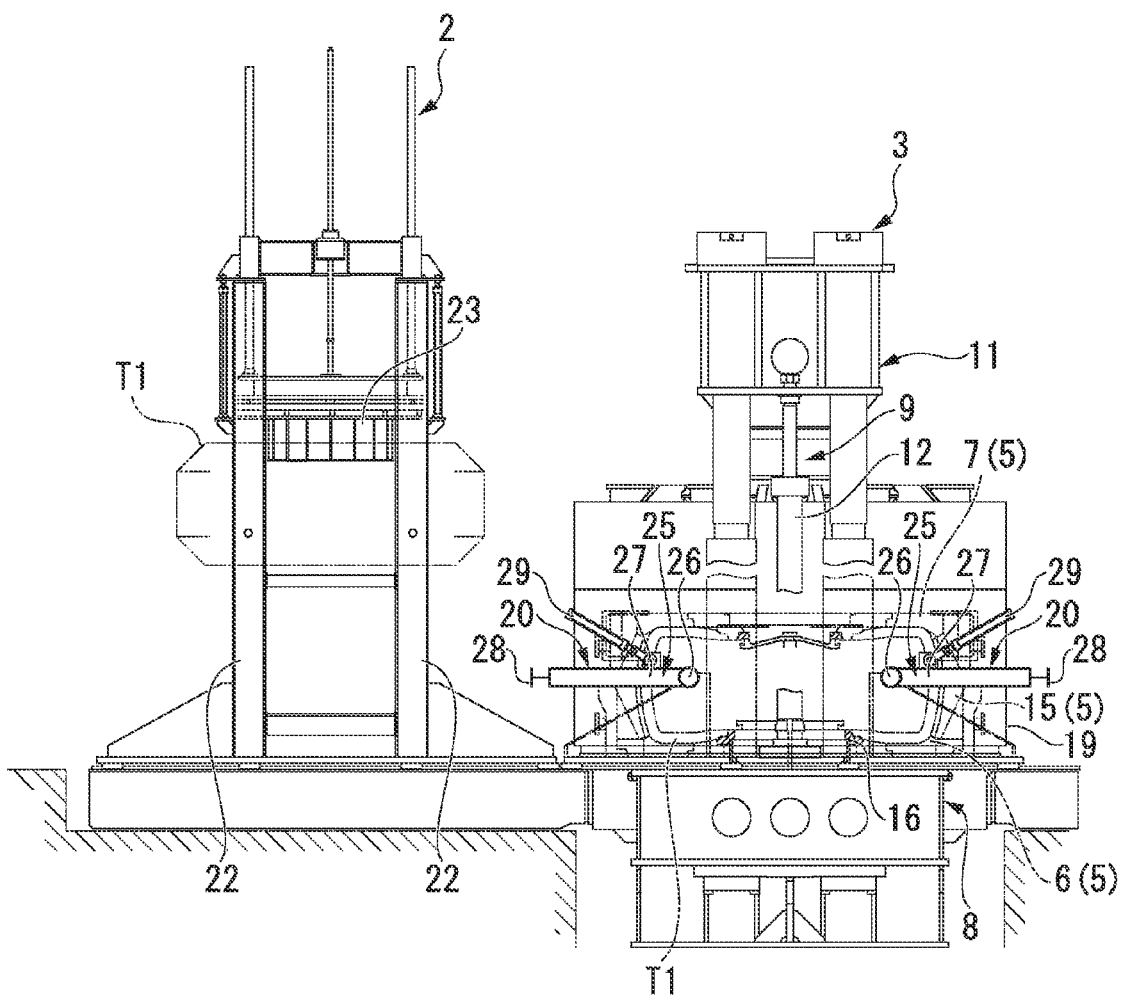
FIG. 2 is a side view of the embodiment in the vulcanizing process.

First, the imported raw tire T1 is chucked by the loading device 2 in a state where the axis line of the raw tire T1 is aligned in the vertical direction and kept in the elevated position as shown in FIG. 2. In this process, the vulcanizing process, in which the raw tire T1 held in the closed mold 5 is vulcanized in the high-heat, high-pressure condition, is performed in the tire vulcanizer 3.

After finishing the vulcanizing process, next, the upper mold supporting part 9 is moved up by the elevator device 11 as shown in FIG. 3. Here, the vulcanized tire T2 is separated from the upper mold 7, leaving the vulcanized tire T2 held in the lower mold 6. The numerical reference "33" indicates the bladder pressing the inner surface of the tire during the vulcanizing process.

Next, the segmental molds 15 are slid to the opened-position, and further the vulcanized tire T2 is pushed up by the lift device 16 of the lower mold supporting part 8 as shown in FIG. 4.

Figure 5:
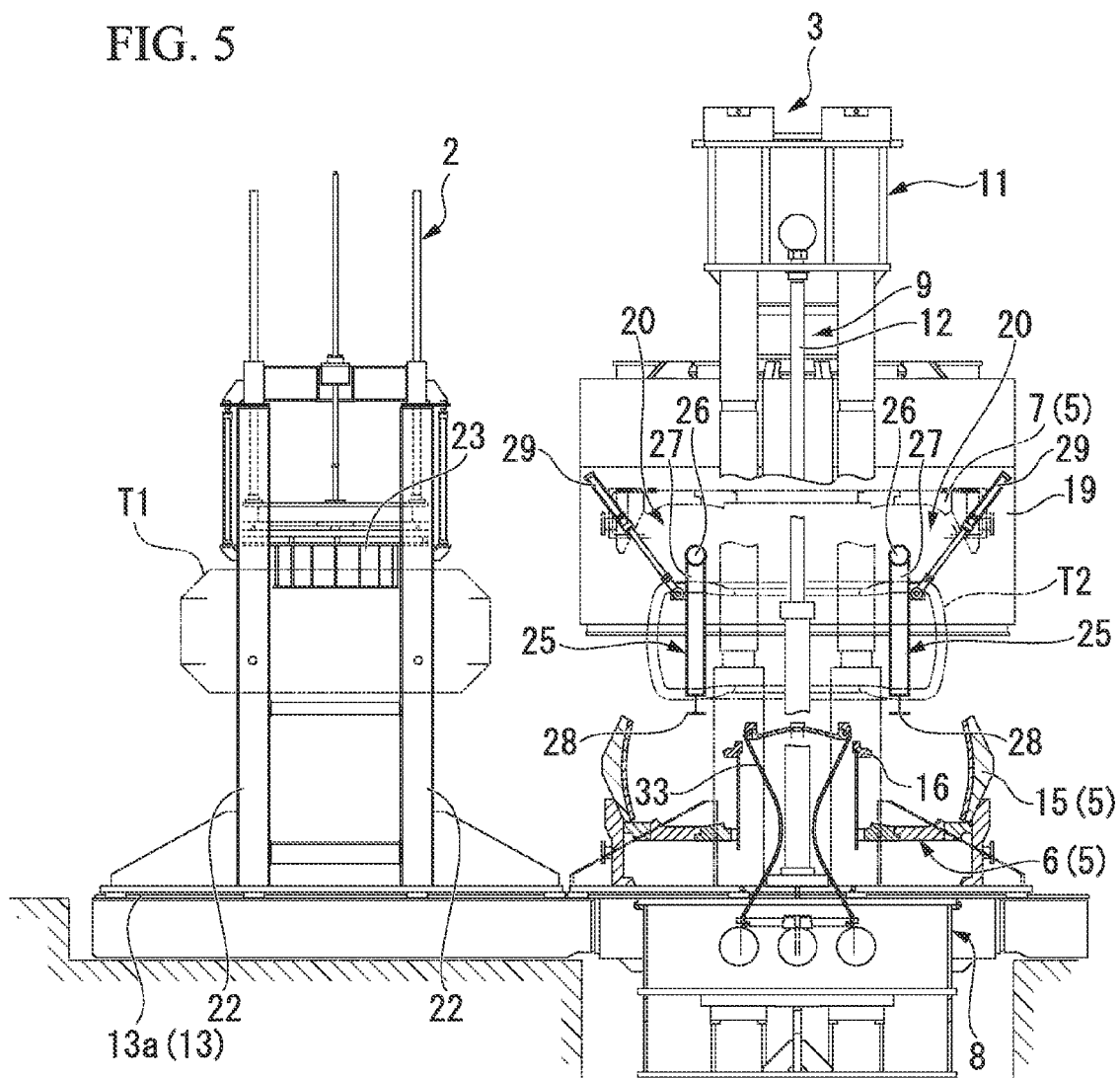
FIG. 5 is a side view of the embodiment in the process for unloading the vulcanized tire.

Because of the action described above, the vulcanized tire T2 is separated from the lower mold 6. Then, the vulcanized tire T2 separated from the lower mold 6 is pushed up by the lift device 16 to the predetermined pushed-up position and held in the position. Then, the extending and contracting part 29 of the tire supporting device 20 shifts its position to the extended side, and the position of the tire supporting part 25 is shifted from the retreated position to the supporting position. Then, the lift device 16 is lowered in this state. Because of the actions described above, the vulcanized tire T2 is placed in the state where it can be exported by the tire supporting device 20 as shown in FIG. 5.

Then, the upper mold supporting part 9 and the loading device are moved to the rear side by the moving device 13 as shown in FIG. 6. Because of the actions described above, both of the raw tire T1, which is supported by the loading device 2, and the vulcanized tire T2, which is supported by the tire supporting device 20, are moved to the rear side horizontally substantially at the same time. The loading device 2 is stopped at the loading position above the lower mold supporting part 8, and the upper mold supporting part 9 is stopped at the position vertically above the receiving device 4. Then, the upper mold supporting device 9 is lowered by the elevator device 11, the vulcanized tire T2 is supported from its lower side by the receiving device 4 to be placed on the receiving device 4.

Next, the tire supporting part 25 of the tire supporting device 20 shifts its position to the retreated position, and the lift device 16 is elevated to the position where it is abutted to the bead part on the lower side of the raw tire T1 as shown in FIG. 7.

Figure 8:
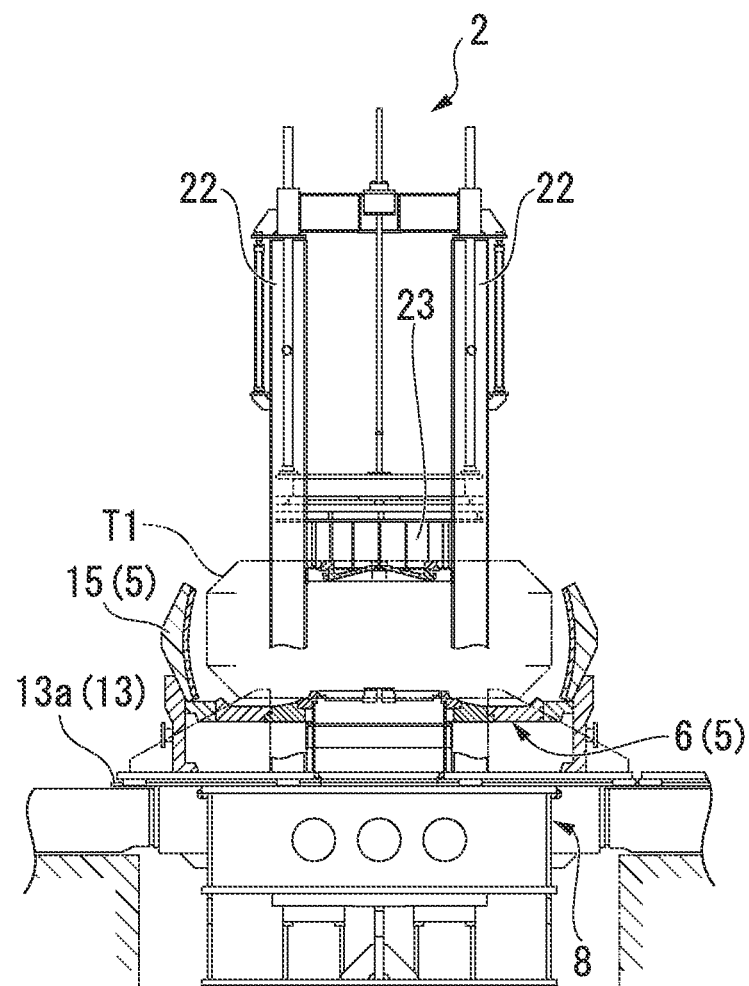
FIG. 8 is a side view of the embodiment in the state prior to the vulcanizing process.

Then, the chucking device 23 and the lift device 16 are lowered at the same time, and the raw tire T1 is held inside of the segmental molds 15 in the opened-position as shown in FIG. 8. Then, the chucking device 23 releases chucking to the raw tire T1 and is elevated.

Figure 9:
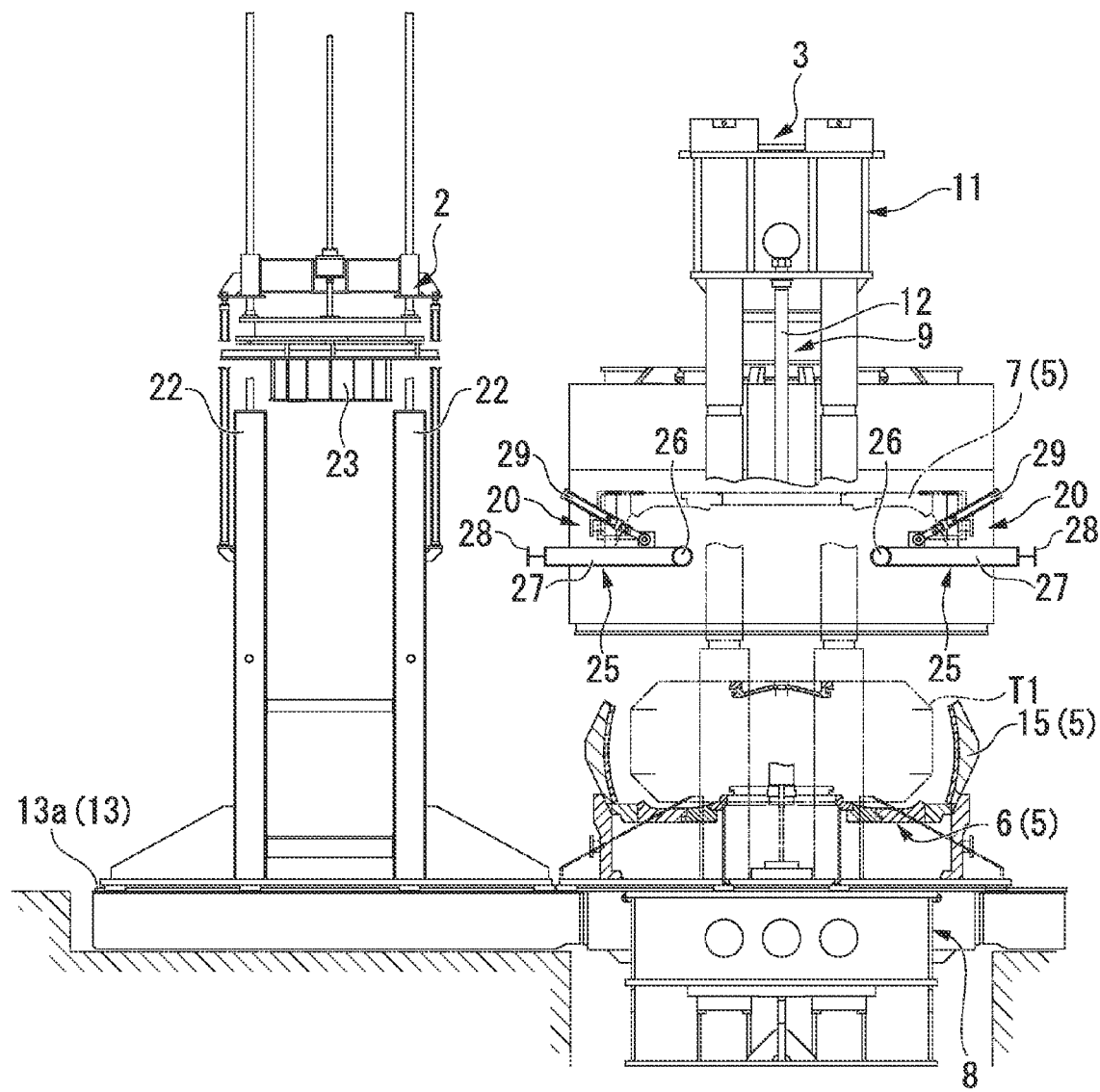
FIG. 9 is a side view of the embodiment in the state prior to the vulcanizing process.

Then, the loading device 2 and the upper mold supporting part 9 are moved to the front side by the moving device 13, placing the loading device 2 and the upper mold supporting part 9 at the importing position and the position vertically above the lower mold supporting part 8, respectively, as shown in FIG. 9. Then, the upper mold supporting part 9 is lowered to close the mold 5 as shown in FIG. 2. Then, the vulcanizing process is performed to the raw tire T1 held in the mold 5.

According to the tire vulcanizer 3 of the above-described present embodiment, the upper mold supporting part 9 can be moved horizontally with the moving device 13 and vertically with the elevator device 11. Also, the vulcanized tire T2 can be picked up by providing the tire supporting part 25, which is capable of supporting the lower side of the vulcanized tire T2, to the upper mold supporting part 9. Because of these configurations, according to the tire vulcanizer 3 of the present embodiment, the vulcanized tire T2 can be exported by the movement of the upper mold supporting part 9 without using the loading device 2 in the process for exporting the vulcanized tire T2.

Furthermore, when the raw tire T1 is loaded with the loading device 2, the upper mold supporting part 9 is retreated from the above part of the lower mold supporting part 8 to the rear side. By utilizing this movement, the vulcanized tire T2 can be picked up to be unloaded. Because of this, there is no need for the loading device 2 to perform reciprocal movement twice for the loading and unloading. Thus, the period of time needed for loading the raw tire T1 and unloading the vulcanized tire T2 can be shortened.

Also, the vulcanized tire T2 can be separated from the lower mold 6 by pushing up the vulcanized tire T2 held in the lower mold 6 by the lift device 16. Therefore, the configuration of the receiving device 4 can be simplified relative to the case where the upper mold 7 stuck with the vulcanized tire T2 is exported to the receiving device 4 and the vulcanized tire T2 is separated from the upper mold 7 with the receiving device 4.

Also, the conventional lift device 16, which is needed for unloading of the vulcanized tire T2 with the loading device 2, can be used without a specific modification. Thus, it can be applicable to existing tire vulcanizing systems with ease.

Furthermore, sufficient strength of the tire supporting part 25 can be obtained without complicating the configuration of the tire supporting part 25 by forming the tire supporting part 25 with the rotation shaft 26 rotatably supported by the upper mold supporting part 9, the swing arm section 27 extending from the rotation shaft 26, and the supporting arm section 28, which is extended from the swing arm section 27 and capable of supporting the lower side of the vulcanized tire T2. This effect is particularly advantageous in exporting a large-sized tire.

Also, according to the tire vulcanizing system 1 of the above-described present embodiment, the process for loading the raw tire T1 and the process for unloading the vulcanized tire T2 can be performed substantially at the same time, since it is provided with the loading device 2, which is placed next to the tire vulcanizer 3, and the receiving device 4, which is placed next to the tire vulcanizer 3 and capable of receiving the vulcanized tire T2 moved to the rear side with the moving device 13 of the tire vulcanizer 3. Because of this, the period of time needed for the processes for loading and unloading can be shortened, and production efficiency can be improved.

The present invention is not limited by the above-described embodiment. Thus, the present invention includes the above-described embodiment with additions, omissions, substitutions, and other modifications without departing from the scope of the present invention. Thus, the specific shapes, configurations, and the like described in the explanation of the present embodiment are only exemplary and can be subjected to modifications.

For example, the tire support part 25 of so called double-end supported type, in which both ends of the supporting arm section 28 are supported by the swing arm sections 27, is explained as an example. However, the tire supporting part 25 of the cantilever type, in which only one end of the supporting arm section 28 is supported by the swing arm section 27, may also be used.

Figure 12:
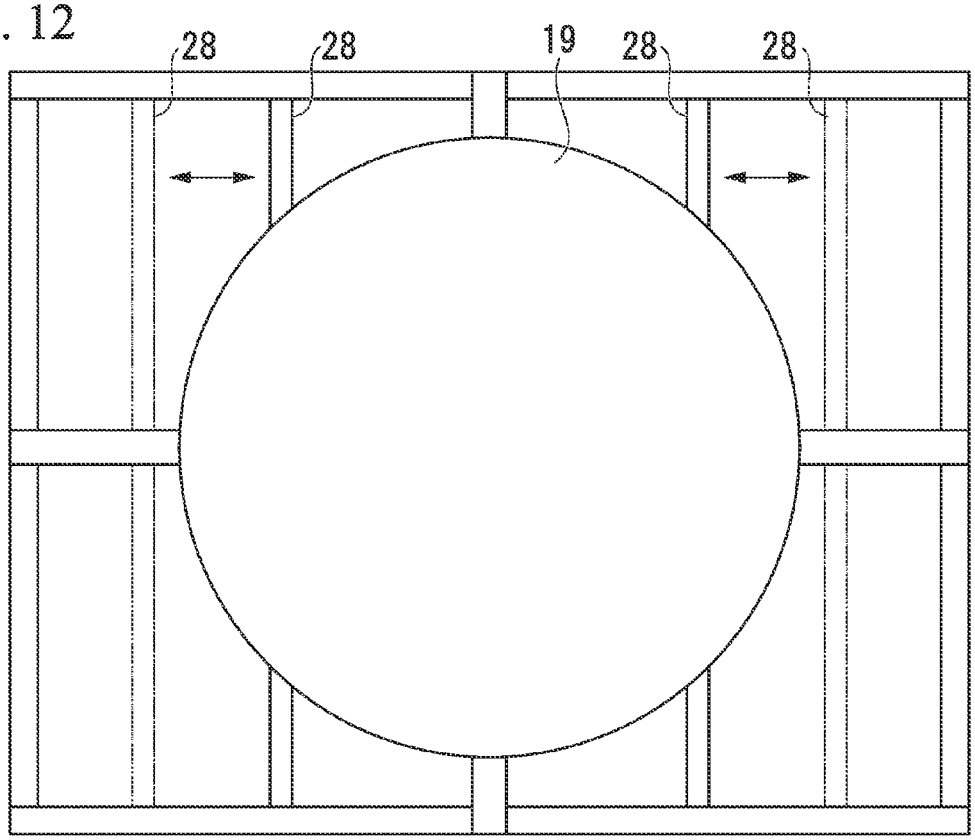
FIG. 12 is a plane view of a modified example of the embodiment corresponding to FIG. 10.

Furthermore, in the above-described embodiment, the tire supporting part 25 that is capable of moving between the retreated position and the supporting position by the swinging motion. However, the tire supporting part 25 can be configured as in the modified example of the present embodiments shown in FIG. 12. In the modified example, the end parts of the supporting arm section 28 are supported in such a way that the support section 28 is capable of sliding horizontally orthogonal to the extension direction of the support section 28. Also, the supporting arm section 28 is configured in such a way that the supporting arm section 28 is capable of shifting positions between the supported position, in which the lower end of the vulcanized tire T2 is supported by the supporting arm section 28, and the retreated position, in which the support section 28 is positioned outer peripheral side of the vulcanized tire T2. In this case, for example, the supporting arm section 28 may be slid by transmitting the driving force of a motor not shown in the drawing with a driving chain or a ball screw.

Also, in the above-described embodiment, an example in which the swing arm section 27 is swung by the extending and contracting device 29 was explained. However, the swing arm section 27 can be swung by rotating the rotation shaft 26 with a motor or the like instead of using the extending and contracting device 29.

INDUSTRIAL APPLICABILITY

The present invention is broadly applicable to tire vulcanizers and tire vulcanizing system with upper and lower molds.

BRIEF DESCRIPTION OF THE REFERENCE SYMBOLS

2: Loading device
4: Receiving device
6: Lower mold
7: Upper mold
8: Lower mold supporting part
9: Upper mold supporting part
11: Elevator device
13: Moving device
16: Lift device
25: Tire supporting part
26: Rotation shaft (shaft section)
27: Swing arm section (arm section)
28: Support arm section (support section)
T1: Raw tire
T2: Vulcanized tire

The invention claimed is:

1. A tire vulcanizer that vulcanizes a tire loaded inside with a lower mold and an upper mold provided to an upper part of the lower mold, the tire vulcanizer comprising:
    a lower mold supporting part configured to support the lower mold;
    an upper mold supporting part configured to support the upper mold;
    a moving device that is configured to move the upper mold supporting part in a horizontal direction;
    an elevator device that is configured to move the upper mold supporting part in a vertical direction;

a lift device that is configured to push up a vulcanized tire held in the lower mold in a condition where the upper mold supporting part is elevated with the elevator device in such a way that the upper mold is retreated above the lower mold; and a tire supporting part that is supported by the upper mold supporting part and configured to be movable between a supporting position and a retreated position, a bottom side of the vulcanized tire being supported at a peripheral side of the vulcanized tire closer to the outside of the vulcanized tire than a pushed-up position of the vulcanized tire pushed upward by the lift device in the supporting position, and the retreated position being positioned at the peripheral side of the vulcanized tire farther from the pushed-up position than the supporting position of the vulcanized tire, wherein the upper mold supporting part is provided with a dome part into which a steam for vulcanizing is supplied, and the tire supporting part is provided in the dome part.

2. The tire vulcanizer according to claim 1, wherein the tire supporting part comprises:
   a shaft section supported rotatably by the upper mold supporting part;
   an arm section extended from the shaft section; and
   a support section protruding from the arm section and configured to support the bottom side of the vulcanized tire.

3. A tire vulcanizing system comprising:
   the tire vulcanizer according to claim 1;
   a loading device that is provided next to the tire vulcanizer and configured to place an un-vulcanized tire on the lower mold supported by the lower mold supporting part of the tire vulcanizer; and
   a receiving device that is provided next to the tire vulcanizer and configured to accept the vulcanized tire moved in a rear direction of the tire vulcanizer by the moving device of the tire vulcanizer.

* * * * *